(12) United States Patent
Coe et al.

(10) Patent No.: US 11,767,122 B2
(45) Date of Patent: Sep. 26, 2023

(54) CARGO PARACHUTE SYSTEM INTERMEDIATE LOAD ATTACHMENT PLATFORM HAVING REDUCED FORCE RELEASE AND PARACHUTE SYSTEMS USING SAME

(71) Applicant: P.D. of Miami, Inc., Deland, FL (US)

(72) Inventors: William John Coe, Deland, FL (US); Ignatius Kapp, Debary, FL (US)

(73) Assignee: P.D. of Miami, Inc., Deland, FL (US)

( * ) Notice: Subject to any disclaimer, the term of this patent is extended or adjusted under 35 U.S.C. 154(b) by 0 days.

(21) Appl. No.: 17/806,490

(22) Filed: Jun. 12, 2022

(65) Prior Publication Data
US 2022/0396362 A1    Dec. 15, 2022

Related U.S. Application Data

(60) Provisional application No. 63/210,067, filed on Jun. 13, 2021.

(51) Int. Cl.
*B64D 17/38* (2006.01)
*B64D 17/34* (2006.01)
*B64D 17/64* (2006.01)

(52) U.S. Cl.
CPC ........... *B64D 17/383* (2013.01); *B64D 17/34* (2013.01); *B64D 17/64* (2013.01)

(58) Field of Classification Search
CPC ........ B64D 17/22; B64D 17/34; B64D 17/38; B64D 17/383
See application file for complete search history.

(56) References Cited

U.S. PATENT DOCUMENTS

| 6,622,968 | B1 * | 9/2003 | St. Clair | B64D 17/68 244/142 |
| 2004/0169111 | A1 * | 9/2004 | Christof | B64D 17/34 244/152 |
| 2008/0011902 | A1 | 1/2008 | Fox, Jr. | |
| 2009/0026319 | A1 * | 1/2009 | Strong | B64D 17/64 244/152 |
| 2012/0305713 | A1 * | 12/2012 | Deazley | B64D 17/34 244/152 |
| 2020/0123815 | A1 | 4/2020 | Fox, Jr. | |
| 2020/0377218 | A1 | 12/2020 | Coe | |

FOREIGN PATENT DOCUMENTS

WO    WO 2020/243451 A1    12/2020

* cited by examiner

*Primary Examiner* — Richard G Davis
(74) *Attorney, Agent, or Firm* — Frank B. Arenas, Esq.; Shalom Wertsberger

(57) ABSTRACT

An Intermediate Load Attachment Platform (ILAP) for attaching a cargo load to at least one main parachute, the ILAP protects a release mechanism disposed at least partially therein, the release mechanism is coupled to a drogue mechanism, such that the drogue is released from the ILAP when the release mechanism is opened, thus beginning deployment of the main canopy.

20 Claims, 10 Drawing Sheets

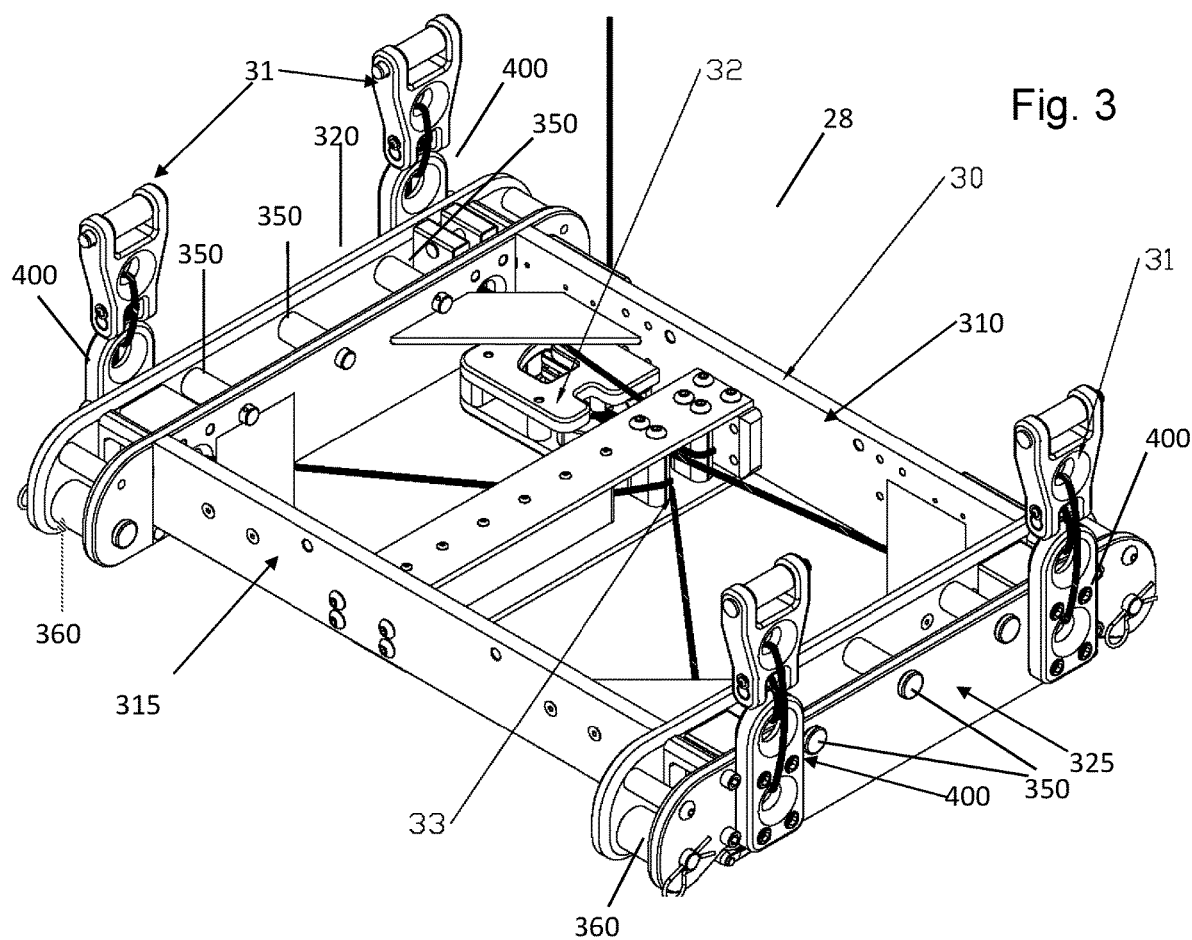
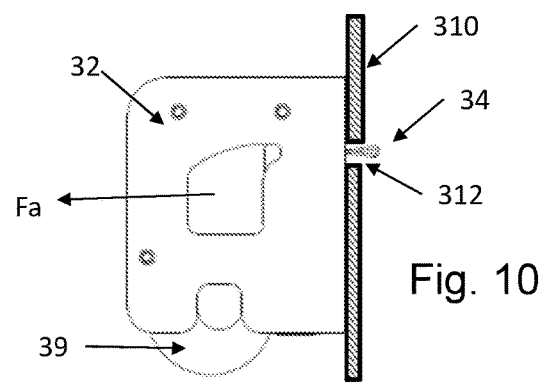

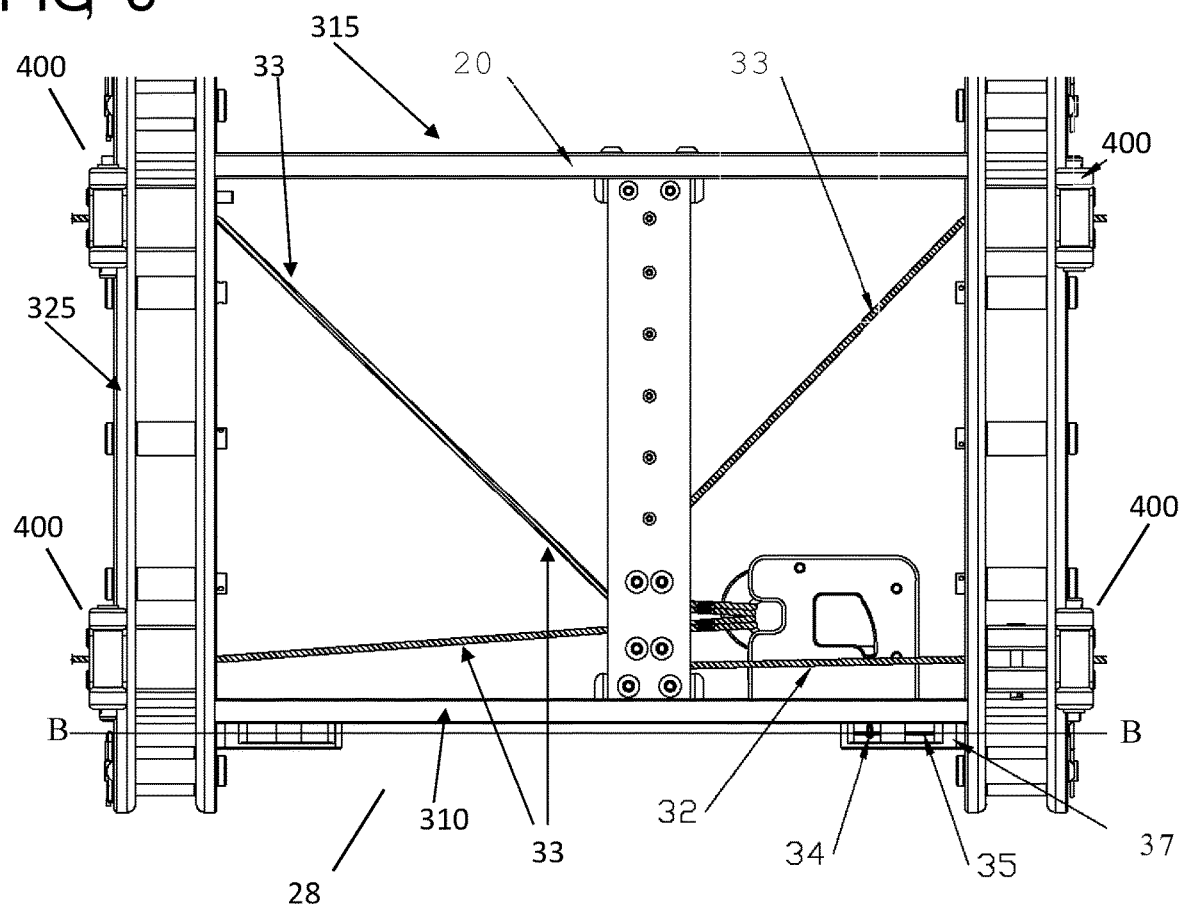
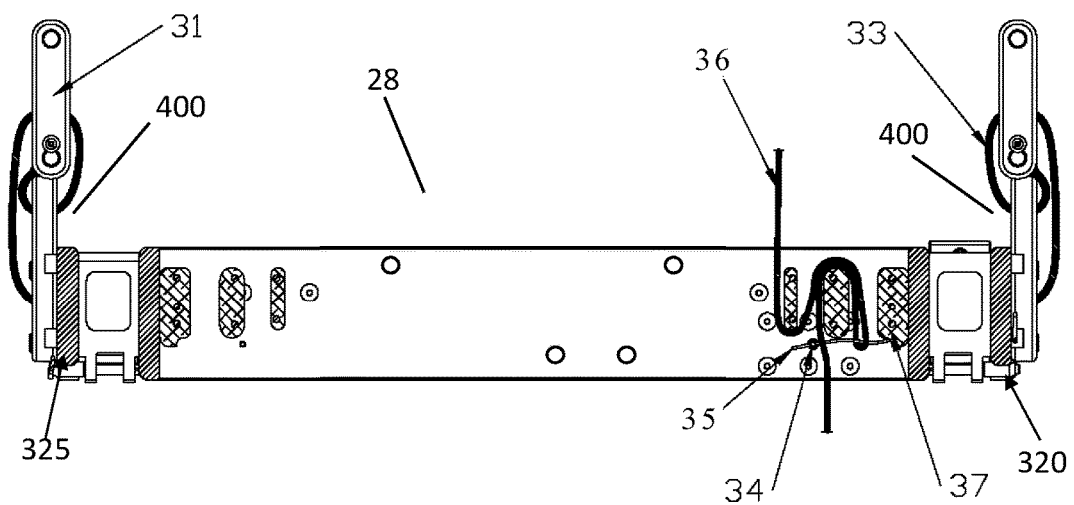

CARGO PARACHUTE SYSTEM INTERMEDIATE LOAD ATTACHMENT PLATFORM HAVING REDUCED FORCE RELEASE AND PARACHUTE SYSTEMS USING SAME

INCORPORATION BY REFERENCE

Currently commonly owned U.S. patent application Ser. No. 16/886,726, published as US Patent Publication No. US-1010-0377218, as well as related U.S. patent applications Ser. Nos. 62/853,841, 62/852,863, 62/704,736, 63/210,067 and PCT Application No. PCT/US2020/035153 are incorporated herein by reference in their entirety, to the extent they do not conflict with the instant disclosure herein.

COPYRIGHT NOTICE

A portion of the disclosure of this Patent document, including the drawings and Appendices, contain material which is subject to copyright protection. The copyright owner has no objection to the facsimile reproduction by anyone of the Patent document or the Patent disclosure as it appears in the Patent and Trademark Office Patent files or records as long as clear and visible reference is made showing the applicant, patent or patent publication number, but otherwise reserves all copyright rights whatsoever.

FIELD OF THE INVENTION

Versions and embodiments of the present invention relate generally to cargo parachuting system and more particularly to an intermediate load attachment platform coupling between a cargo load and a parachute in a cargo parachuting system, and to methods and systems for controlled deployment of the main parachute.

BACKGROUND

The following is not to be considered admitted prior art but to show the related art in the field. Heavy weight load parachute systems generally assembled of a pilot parachute and/or a "drogue", a main parachute initially disposed in a deployment bag which is optionally disposed in a container, and a cargo load (interchangeably referred to as "cargo" or "load" or "payload" in this specification) coupled to the main parachute. The parachute comprises a canopy coupled to the cargo via suspension lines and risers. Cargo parachuting systems may utilize a platform which couples the main parachute to the cargo. The platform may further provide a stable basis for optional equipment such as a guidance system(s), sensors, power source(s), and the like.

A bridle known as sling couples between the cargo and the platform. The drogue may be also coupled to the platform by a drogue bridle.

The operation sequence of a cargo parachute system generally comprises dropping an assembly comprising the cargo load attached to the parachute system from an aircraft. The drogue parachute is deployed shortly after cargo system is dispatched from the aircraft, and the drag induced thereby begins to slow down the falling assembly and to stabilize its fall at a reduced terminal velocity. This period is referred to as the drogue fall stage. After the assembly velocity has decreased, the main parachute is deployed and begins to inflate. At that stage the drogue parachute may be allowed to collapse. After the main parachute is fully inflated and the assembly is in flight mode, the assembly is in its stable descent stage, until the cargo reaches the ground (or water body).

Heavy weight parachuted loads impart high forces to the drogue, which in-turn cause high release forces on any release mechanism which releases the drogue bridle prior to deployment of the main parachute(s). The required high release forces tend to limit the weight of the cargo package, as higher weight equal higher activation forces that must be applied to deploy the main parachute from its cargo load. Such higher forces require additional energy handling capabilities and a release mechanism capable of handling of the associated shock loads, providing reliable and timely release, while avoiding premature release.

U.S. patent application Ser. No. 16/886,726, titled "Release Mechanism Device, Parachute Systems and Parachute Stabilization", describes examples of reduced force release mechanisms applicable to allow higher weight loads parachute systems. When the release mechanism is opened, the drogue is released from the cargo, however one or more activation lines may couple between the drogue and the main parachute, and as the drogue collapses and is released from the cargo, residual drag thereof is utilized to begin the deployment sequence of the main parachute. Notably other mechanisms may be utilized to begin deployment of the main parachute, but utilizing the drogue residual drag is common.

The drogue release may activate the main parachute deployment by a main activation line, which is a line attached to the drogue on one end and to a main parachute release arrangement, such as a pin, release string, spring-loaded mechanism, explosive ejector, and the like, on the other end. During drogue fall the main activation line is not under tension. As the drogue bridle is released the drogue begins to collapse, but the residual drag pulls the main activation line which in turn begins the deployment sequence of the main parachute.

Release mechanisms similar to the ones described in the above identified patent applications shall be utilized as exemplary release mechanism suitable for use in the present invention, however, any suitable release mechanism type may be utilized provided it can sustain the required load thereupon, and controllably transition from closed state to an open state.

Prior art solutions have included a "single Latch system" device with minor mechanical advantage and prone to premature release of the drogue. Another prior art solution uses pyrotechnic explosive cutter to sever the drogue from the main parachute. This solution had negative consequences of premature releases, a consumable item which was disliked by the users and the difficulty of shipping hazardous materials within a country and heightened regulatory scrutiny when importing/exporting hazardous materials to foreign countries. Other release mechanisms may be beneficially used in some embodiments of the invention, such as, by way of example the lever-lock release mechanism, disclosed in US Patent Pre-Publication No. US2020/0123815 to Fox Jr.

The release mechanism is actuated by an actuator. Such actuator may be controlled by numerous types of controllers, ranging from a timer, to altitude sensors, velocity sensors, acceleration sensor, remote control systems, navigation systems, combinations thereof, and the like. Airborne Guidance Units (AGU) may be used to provide Global Positioning System (GPS) based steering of the parachuted assembly. Such AGU may be utilized as a sensor and/or sensor/actuator assembly. In certain embodiments the sensor and the actuator are integrated into a single unit. By way of one simple embodiment, the AGU is programed to act as a timer which begins a countdown period when the parachuted assembly is dispatched from an airplane. After a preset time the AGU actuates the release mechanism, causing the deployment of the main parachute, where the AGU continues to guide the assembly using steering lines to control the parachute flight path and guide the assembly into the desired drop zone (sometimes also called the landing zone or target or impact point).

SUMMARY

Advantages of versions of the present invention include avoidance of most if not all of the above prior art shortcomings by providing the intermediate load attachment platform with an embedded release mechanism(s) as disclosed hereinunder, and by other novel components and features.

It is an object of certain aspects of the present invention to provide an intermediate load attachment platform having embedded therein a release mechanism for releasing a drogue bridle under tension during a drogue fall.

It is further an object of certain aspects of the present invention to provide an arrangement for releasing a drogue parachute in tension utilizing a release mechanism coupled to an intermediate load attachment platform, the release mechanism allowing low activation force from various release control devices, as well as relatively short activation line.

It is further an object of certain aspects of the present invention to provide an intermediate load attachment platform with a novel line and buckle (colloquially named a yoke) arrangement which provides a plurality of bridle anchor points and/or other attachment points, for holding and controllably releasing a drogue parachute under tension, utilizing a release mechanism coupled to an intermediate load attachment platform (ILAP).

Therefore, in an aspect of the invention there is provided a ILAP having a release mechanism at least partially disposed within a frame of the ILAP. Operationally the release mechanism is configured to controllably couple a drogue to the ILAP when the release mechanism is in a closed state, and release the drogue when the release mechanism is in an open state. In an embodiment of the invention there is provided a cargo parachute system intermediate load attachment platform (ILAP) comprising a frame having at least one cargo anchor point, at least one main parachute anchor point, and a drogue attachment; a release mechanism at least partially disposed within, and/or embedded in, the ILAP, the release mechanism having a trigger and a releasable hook dimensioned to engage at least a portion of the drogue attachment, and being transitionable between a closed state and an open state responsive to trigger activation, wherein while in the closed state a portion of the drogue attachment is engaged by the release hook, and while in the open state the drogue attachment is disengaged from the hook, thereby releasing the drogue from the ILAP.

The ILAP frame may be formed by a plurality of vertically extending external walls each wall extending between a frame upper portion and a frame lower portion, the external walls defining an intraframe space, and wherein the release mechanism is disposed at least partially within the intraframe space.

Optionally the drogue attachment comprises a plurality of drogue holding lines. Further optionally each drogue holding line is coupled to a yoke.

In certain optional embodiments each yoke is coupled to the respective drogue holding line in a compound pulley arrangement. Optionally the pulley arrangement is formed by a plurality of drogue anchors, wherein the respective drogue holding line extends from the hook of the release mechanism via an opening formed in the respective yoke and further therefrom via an opening in the respective drogue anchor, the drogue holding line further extends from the drogue anchor opening and is affixed to a drogue line attachment of the yoke.

In some embodiments the drogue anchor is integrated with the cargo anchor, the main parachute anchor, or with a combination thereof.

In certain embodiments the release mechanism comprises a plurality of interlockable levers forming a mechanical sequence by mechanical sequential communication therebetween, each of the plurality of levers being rotatably coupled to a support, each of the levers having a retaining region having a retainer or an abutment, a rotatable fulcrum point within a fulcrum region, a load point within a load region, where a first lever in the mechanical sequence operating as a trigger lever for starting a release sequence of the release mechanism, a last lever in the mechanical sequence rotatably and controllably operating as the release hook for ending the release sequence, and wherein the levers interlock in a first pre-determined configuration in the closed state and unlock into a second pre-determined configuration in the open state.

Optionally the main parachute anchor point(s) are coupled to or embedded in the frame top portion, and the cargo anchor point(s) are coupled to or embedded in the frame bottom.

In another aspect of the invention there is provided a cargo parachute system for parachuting a cargo load, the system comprising a main parachute, a drogue parachute having a drogue bridle, and an intermediate load attachment platform (ILAP) comprising a frame having at least one cargo anchor point, at least one main parachute anchor point, and a drogue attachment coupled to the drogue bridle, a release mechanism at least partially disposed within, and/or embedded in, the ILAP, the release mechanism having a trigger and a releasable hook dimensioned to engage a portion of the drogue attachment, and being transitionable between a closed state and an open state responsive to trigger activation, wherein while in the closed state a portion of the drogue attachment is engaged by the release hook, and while in the open state the drogue attachment is disengaged from the hook, thereby releasing the drogue from the ILAP, the system further comprising an actuator configured for activate the trigger so as to allow the release mechanism to transition from the closed state to the open state, wherein the main parachute is coupled to the main parachute anchor point, and the drogue attachment or a portion thereof is releasable from ILAP upon transition of the release mechanism from the closed state to the open state.

Optionally the parachuting system further comprises a main activation line having a first end coupled directly or indirectly to the drogue, and a second end coupled to a main canopy release pin, the main canopy release pin being operational to initiate a main parachute deployment sequence responsive to a tensile force exerted by the drogue after release of the drogue attachment.

BRIEF DESCRIPTION OF THE DRAWINGS

Some embodiments of the invention are described herein with reference to the accompanying drawings. The description, together with the figures, enables and makes apparent to a person having ordinary skill in the art how the teachings of the disclosure may be practiced, by way of non-limiting examples. The figures are for the purpose of illustrative discussion and no attempt is made to show structural details of an embodiment in more detail than is necessary for a fundamental and enabling understanding of the disclosure. For the sake of clarity and simplicity, some objects depicted in the figures are not to scale. Understanding that these drawings depict only typical embodiments of the invention and are not therefore to be considered to be limiting of its scope, the invention will be described and explained with additional specificity and detail through the use of the accompanying drawings in which:

FIGS. 3 and 4 depicts top perspective views of an exemplary ILAP.

FIG. 5 depicts a top view of the ILAP of FIG. 3 and FIG. 4.

FIG. 6 depicts a side cross-section of the ILAP along section line B-B.

FIG. 10 depicts a simplified diagram of a section of the front wall of the ILAP frame, and the release mechanism.

DETAILED DESCRIPTION OF EXEMPLARY EMBODIMENTS

Figure 1:
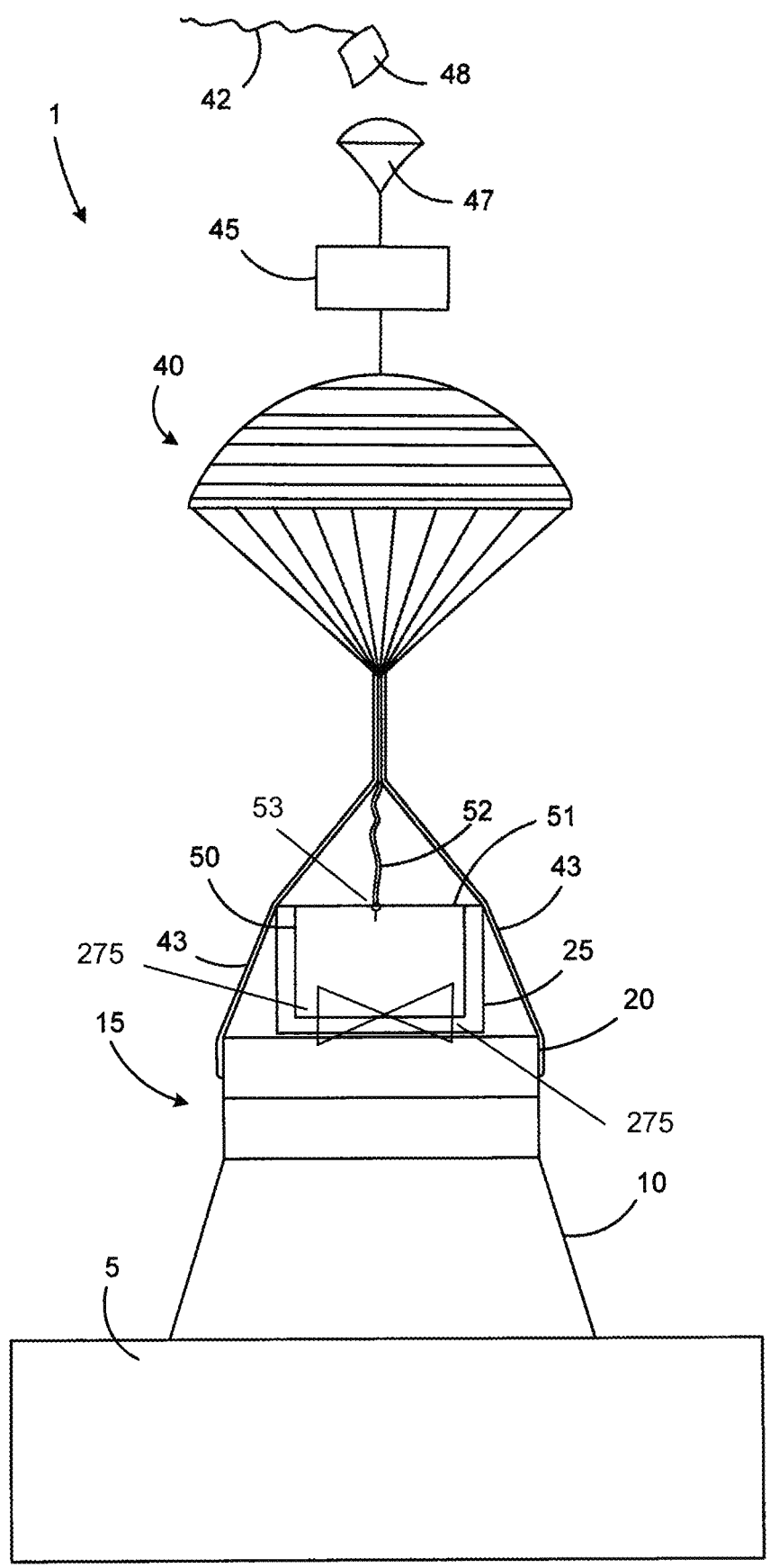
FIG. 1 depicts a schematic diagram of an embodiment of a cargo parachute system during the drogue fall stage.

Embodiments of a release mechanism and additional components will be described below, by way of exemplary illustration only. The described embodiments should not be construed as limiting the scope of different aspects and embodiments of the invention. Versions illustrating basic concept of various aspects of the invention are shown in detail in the drawings.

FIG. 1 depicts a schematic diagram of a version of a cargo parachute system 1 in accordance with an embodiment of the invention, during the drogue fall stage, shortly after it has been dropped from an aircraft. The figure depicts the cargo load 5, which is coupled to the Automated Guidance Unit (equivalently AGU hereinafter) 15 and/or the ILAP 20 by harness sling 10.

The AGU 15 may be coupled above or below the ILAP 20, disposed inside the ILAP, or integrated therewith. The cargo 5 may be coupled by the cargo sling 10 directly to the AGU, or coupled to the ILAP. The cargo may also be coupled to both the ILAP and the AGU. For brevity, the examples used hereinafter shall relate to the cargo sling as being coupled to the ILAP. As the ILAP is operationally disposed between the parachute(s) and the cargo, the ILAP side facing the parachute shall be referred to as the upper side and the side facing the cargo shall be referred to as the lower side.

Prior to dropping the cargo parachuting 1 of an aircraft the main canopy (also called main parachute) and other equipment are attached to the upper side of the ILAP 20. An optional main canopy container 25 is coupled to the upper side of the ILAP 20. Prior to its deployment, at least one main canopy 50, is packed in a folded state in the main parachute deployment bag 51 within a deployment bag that may be disposed within the optional container 25. In certain systems a container is not utilized and the deployment bag is attached to the ILAP and/or the AGU. By way of non-limiting example, U.S. patent application Ser. No. 16/886,726 describes a parachute stabilization system 375 which restrains the deployment bag motion which may be utilized to couple the deployment bag to the ILAP and/or the AGU until the release of the drogue which begins the main parachute deployment sequence. As seen in FIG. 1 which depicts the system 1 during drogue fall, a drogue 40 is coupled to the ILAP via a drogue bridle 43.

In certain optional embodiments a small pilot parachute 47 (P/C) is utilized to extract the drogue 40 from a drogue deployment bag 45. When dropped from the aircraft a static line 42 is coupled between the aircraft and a pilot parachute bag 44 which contains pilot parachute 43. The static line 42 extracts the pilot parachute 43 from bag 48, causing the pilot parachute 43 to deploy and in turn extract the drogue 40 from the drogue bag 45 thus deploying the drogue 40. In some embodiments the static line is connected directly to the drogue bag 45, obviating the need for the pilot parachute.

During the drogue fall stage the system is slowed down and stabilized by the drogue. The drogue bridle 43 is coupled to a release mechanism which is disposed within the ILAP or is integrated thereto, such that opening of the release mechanism releases the drogue bridle. After certain condition(s) are met, a trigger actuator is activated to cause or allow the release mechanism to transition from a closed state to open state, and thus releases the tensioned connection between the drogue bridle 43 and the ILAP 20. Any number of release conditions may be utilized, such as by way of non-limiting example, elapsed time, altitude, speed, pressure, location, and the like.

Once the release mechanism is opened the drogue 40 is released from the ILAP 20, and in the depicted embodiment, as it collapses an activation line 52 pulls a one or more canopy release pins which releases the main canopy deployment bag 51 from the ILAP and begins the main parachute deployment sequence. By way of example, in systems which utilize a container the canopy release pin may allow the container to open and release the deployment bag 51, and in systems which does not utilize a container the pin releases the deployment bag itself from its stabilization system 375. Combinations such as a partial container which may serve to restrain the deployment bag are also known.

Figure 2:
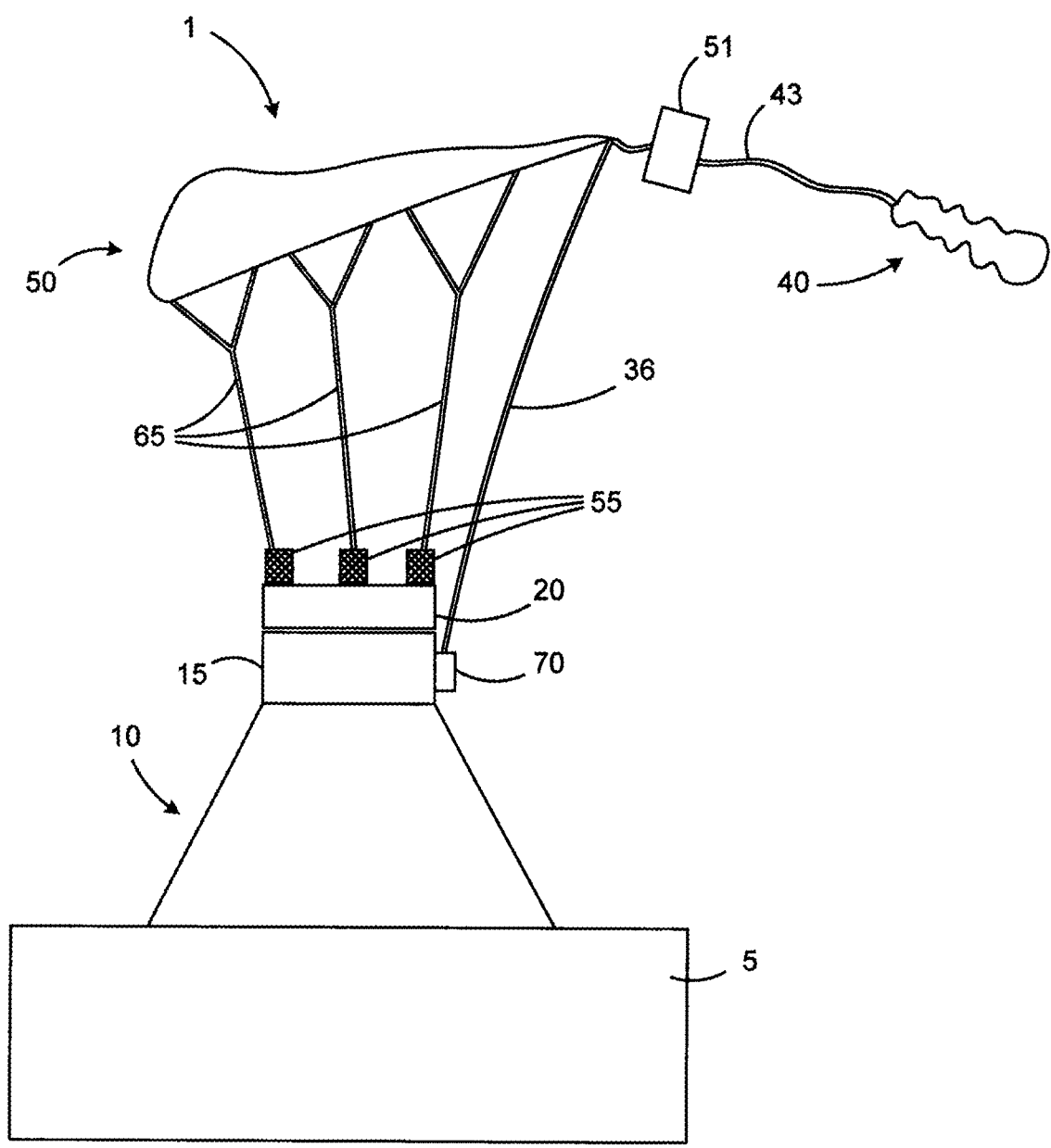
FIG. 2 depicts the deployed cargo parachuting system 1 during descent with the canopy fully deployed.

FIG. 2 depicts the deployed cargo parachuting system 1 during descent with the main canopy 50 fully deployed, and coupled to the ILAP via risers 55 and suspension lines 65, as known. Steering lines 36 extend from spools 70 in the AGU 15 to the canopy 50 and are used to direct the descent. The drogue 40 and the drogue bag 45 merely dangle from the main canopy 50 via the drogue bridle and/or a retention line. Optionally, no retention line is used, and the drogue and drogue bag are completely released from the main canopy, depending on mission requirements.

Figure 4:
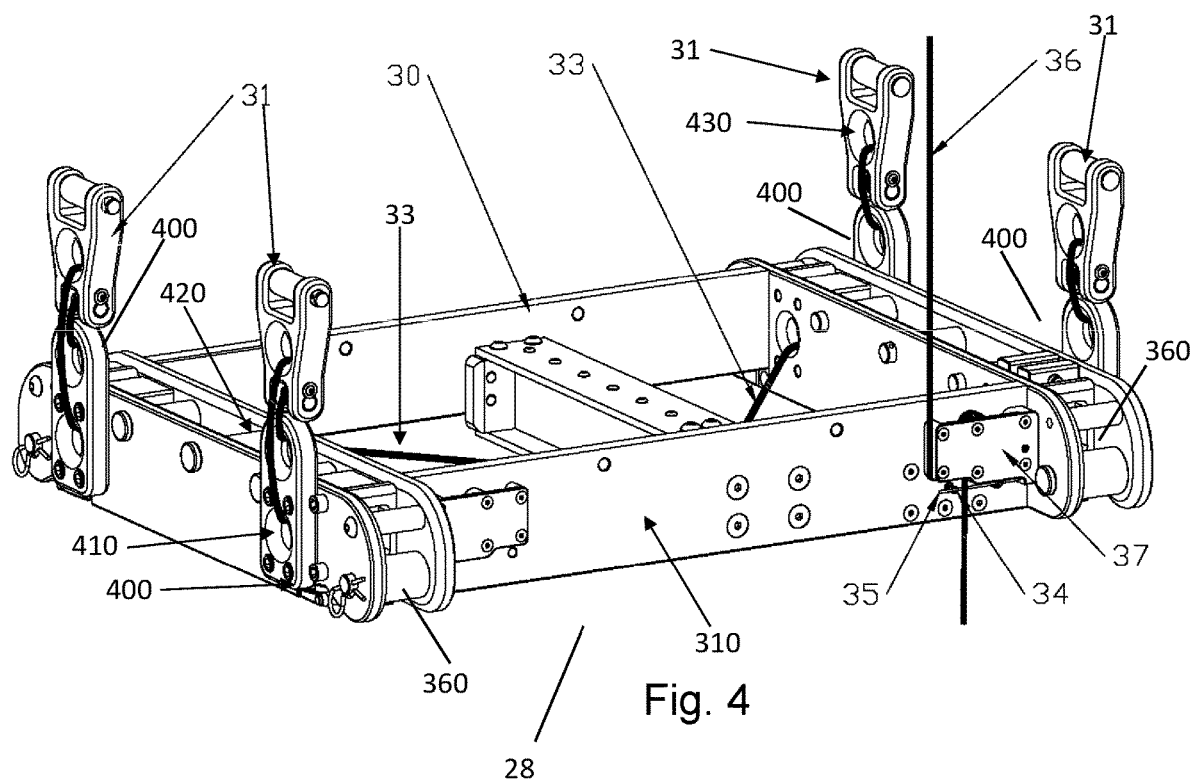

FIGS. 3-4 depicts top perspective views of an exemplary ILAP 20. FIG. 5 depicts a top view of the ILAP of FIGS. 3-4, and FIG. 6 depicts a side cross-section of the ILAP along section line B-B depicted in FIG. 5.

The ILAP 30 is formed of a frame 28 having a plurality of walls extending vertically. While strengthening members are explicitly considered and while some such members are shown they are neither enumerated nor described in details as they are optional and are mission determined for specific requirements dictated by the like of the load weight, fragility of the cargo, the size of the canopy, environmental conditions (night drops and/or inclement weather) and the like.

In the figures front wall 310, back wall 315, right wall 320 and left wall 325 form a frame 28. Several anchors are either formed in the frame or integrated therewith. In the depicted example pins are used as cargo anchor points 360 and canopy anchor points 350 are shown. (While the exemplary ILAP depicts a cargo anchor in each corner of the frame and six canopy anchors for receiving the risers 55 are disposed in two groups of three pins 350). Additional anchors may be provided, such as for securing the AGU 20, securing the canopy container 25 and the like. The depicted anchors are implemented as pins extending between the external right 320 and left 325 walls and corresponding internal wall. The selection of the type and number of anchors are mission determined for specific requirements.

A release mechanism 32 is disposed at least partially within the frame 28 or otherwise embedded therewith. The release mechanism 32 in the depicted figures is anchored directly to the front wall 310. Notably in other embodiments (not shown) the release mechanism may be anchored via intermediate members, or portions of the release mechanism may be formed by the frame or portions thereof. Further notably, while the depicted release mechanism is similar to a release mechanism disclosed in U.S. patent application Ser. No. 16/886,726 in the present example, any suitable release mechanism which provides the desired strength, mechanical advantage, and the like, as dictated by the mission requirements and choices specific for relevant embodiments, may be utilized without departing from the example. However, an important feature of the release mechanism according to the invention is its disposition, at least in part, within the protective confines of the ILAP, which makes the parachute system and the ILAP itself more reliable by the protection the ILAP provides to the release mechanism. More detailed description of two exemplary embodiments of suitable release mechanism are shown in FIGS. 12-16.

The ILAP 20 further has a controllable drogue attachment. The drogue attachment may be embodied in numerous manners, but generally the drogue attachment allows controllable release of the drogue bridle 43 from the ILAP. During the drogue fall stage the drag generated by the drogue 40 is coupled to the ILAP via drogue bridle 43. The drogue stabilizes the load and slows down the parachuted assembly descent. As described, when certain conditions are met the drogue is released from the ILAP 20 and the release initiates the main canopy 50 deployment. It is noted that in certain embodiments the drogue 40 continues to be attached to the parachuted assembly after the main canopy 50 opens, and is thus still coupled indirectly to the ILAP 20, however this coupling should not be confused with the drogue fall state where the drogue 40 drag is coupled to the ILAP 20 prior to the main canopy 50 deployment. The drogue can be retained to the parachute via a any convenient retention arrangement such as the drogue bridle, a retention line, and the like, or the drogue may be allowed to separate from the assembly by not using a retention line.

The drogue attachment may comprise direct connection of the drogue bridle to the release mechanism, or connection of drogue bridle to the release via intermediate members. In the embodiments depicted in FIGS. 3-8 the drogue attachment comprises a novel and an advantageous combination of intermediate members.

In certain embodiments the drogue attachment comprises a plurality of buckles, commonly referred to as yokes 31 which are operationally coupled to the drogue bridle 43. The yokes are in turn coupled to respective drogue holding lines 33 which are held directly or indirectly by the release mechanism 32.

Figure 7:
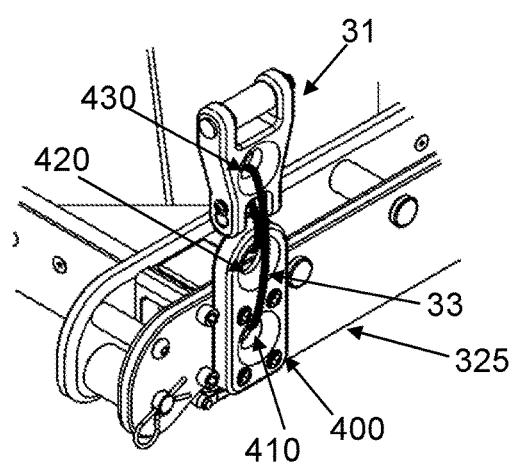
FIG. 7 depicts a localized enlargement of the area about the drogue anchor.

In the embodiment depicted in FIGS. 3-8 a pulley arrangement is utilized in the drogue attachment arrangement. A plurality of drogue anchors 400 is arranged about the periphery of the ILAP 20 frame 28. FIG. 7 depicts a localized enlargement of the area about the drogue anchor 400. Each of the anchors comprises an elongated plate with a lower opening 410 which corresponds to a hole in the frame wall, so that a drogue holding line 33 may pass between the outside the ILAP frame 28 and the inside thereof. As may be seen in FIG. 5 by example, the drogue holding lines 33 from each of the drogue anchors are routed to the release mechanism 32. In the case of lines arriving from behind the release mechanism hook 39 the lines may be routed about a structure which changes the line direction, as may be seen by way of example in FIG. 3.

Figure 8:
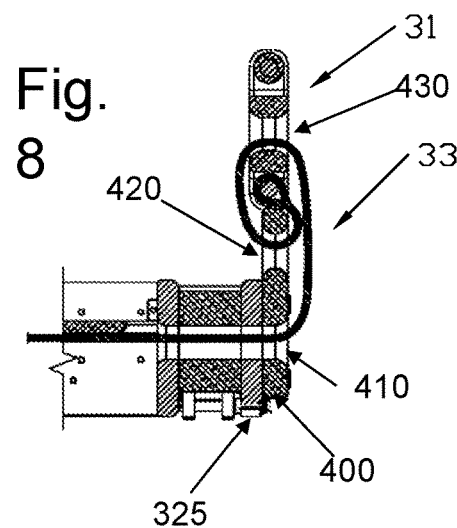
FIG. 8 depicts a cross section of the region about the drogue anchor of FIG. 7.
Figures 9A, 9B:
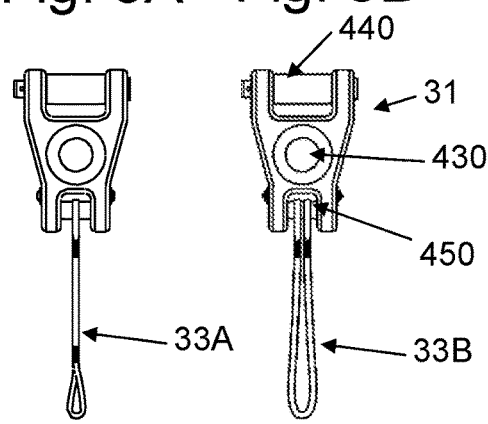
FIG. 9A and FIG. 9B both depict a type of a yoke coupled to a drogue holding line.

The embodiment depicted in FIGS. 3-8 utilizes a compound pulley arrangement to reduce the load on the release mechanism. FIG. 8 depicts a cross section of the region about the drogue anchor 400 of FIG. 7. The drogue holding line 33 passes through the lower opening 410, is routed via a hole 430 in the yoke 31 and further into an upper hole 420 in the drogue anchor 400. After passing via the upper hole 420 the drogue holding line 33 is affixed to the yoke 31. FIG. 9A and FIG. 9B both depict one type of a yoke 31 coupled to a drogue holding line, and the difference between FIGS. 9A and 9B is that in 9A the drogue holding line 33 is denoted as 33A and is a single line having loops formed at each end, while in FIG. 9B the line 33 is denoted as 33B and is formed of a line which is looped back to the yoke, forming effectively two lines, which increases the carrying capacity of line 33. FIG. 9B depicts details of the attachment 440 in the yoke for receiving the drogue bridle, the yoke attachment 450 for receiving the drogue holding line, and the yoke hole 430. Corresponding components are depicted but not enumerated in FIG. 9A.

As seen in more detail in FIGS. 7-8, the drogue holding line 33 routing from the lower opening 410 through the yoke hole 430, back through the drogue anchor 400 upper hole 420, and the attachment to the yoke 450 form a pulley arrangement which reduces the load on the release mechanism 32.

FIG. 10 depicts a simplified diagram of a section of the front wall 310 of the frame, and the release mechanism 32. The release mechanism hook 39 is shown in closed state. The release mechanism trigger 34 is embodied in a loop which is passed through a hole 312 formed in the front wall 310. If a tensile force is imparted to the hook 39, releasing the trigger loop 34 would allow the release mechanism to transition from the closed state to an open state where the hook is free to swing and release any lines attached thereto. Optionally, an additional release force Fa may be applied to the release mechanism to increase the reliability of timely release when the trigger loop 34 is released. Such release force may be applied by any desired device, such as a spring, a compressive element, and the like. Such additional release force Fa may be applied to individual levers, hooks, trigger and the like of the release mechanism and depend on the type of the release mechanism used in the relevant embodiment.

Figure 11:
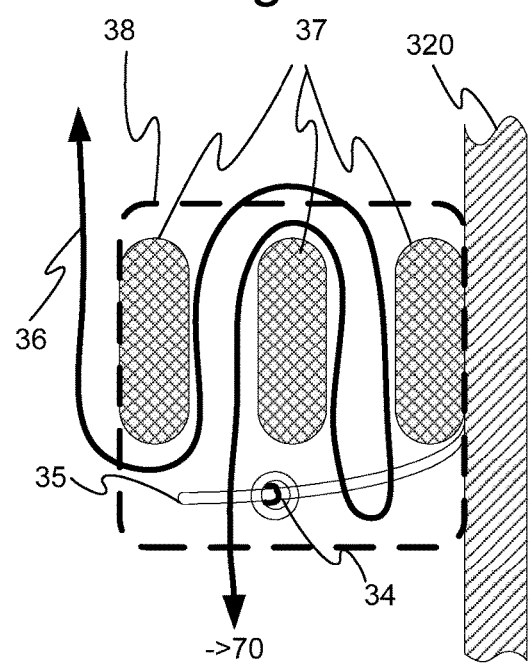
FIG. 11 depicts a cross-section of an optional trigger release arrangement.

FIG. 11 depicts a cross-section of an optional trigger release arrangement. The trigger release arrangement is disposed on the front wall 310, near side wall 320, in the vicinity of hole 312. The trigger release arrangement comprises a plurality of baffles 37 which are mounted on the outside of the front wall 310 in spaced-apart relationship. The trigger release loop 34 is passed through the hole 312 and is retained by a trigger pin 35, which is passed through the loop. The trigger pin 35 may be implemented in any convenient manner, such as a pull pin, a stiffened line, a tear-off loop and the like. In the depicted embodiment the trigger pin 35 comprises a flexible line. Steering line 36 extends from the canopy 50 to a spooling mechanism 70 disposed on, or coupled to, the AGU 15, and engages the trigger pin 35 prior to the opening of release mechanism 32. As seen, the steering line 36 extends between the baffles 37, such that tensioning of the steering line would exert force on the pin 35. When sufficient force is applied to the trigger pin 35 by the steering line 36 the pin deforms and releases the trigger loop 34. It is noted that additional pull force applied to the steering line 36 would cause sufficient deformation of the flexible line acting as a trigger pin 35 to allow disengagement of the pin from the steering line, and the steering line is then free to disengage from the baffles 37. The release of trigger pin 35 from the trigger loop 34 allows the release mechanism 32 to transition from closed to open state, thus releasing the hook and in turn releasing the drogue holding lines 33.

Notably other trigger and/or trigger release mechanisms may be utilized, such as electrical solenoid, a motor, an impeller driven release, a pressure activated release, and the like. The actuator may form the trigger release mechanism, or act to actuate an intermediate trigger. By way of example, the AGU may act as an actuator by way of sending electrical signal to a trigger, or by pulling a line that actuate the trigger. Furthermore, the actuator may be the trigger, such a timer or altitude based trigger actuator acting independently to allow the release mechanism to open. More than one trigger and/or actuator may be utilized.

In typical example of deployment of the cargo parachute system, the parachuted assembly is prepared for dropping from an aircraft by being brought to the drop-ready state. The description of the drop-ready does not require operations to be performed in the order described, but merely states the relative disposition of various elements of the parachuted assembly. In the drop-ready state, the cargo load 5 is coupled by sling 10 to one or more cargo anchors 360 on the ILAP 20. AGU 15 is coupled to the lower side of the ILAP. The canopy 50 is disposed in a folded state a main canopy deployment bag 51, and with its suspension lines 65 coupled by risers 55 to canopy anchors 350. Optionally the deployment bag 51 is at least partially disposed within a container 25, which may be a complete or a partial container. Alternatively, the deployment bag a main canopy deployment bag 51 is attached to the ILAP by a stabilization system 375. At least one canopy release pin is utilized to maintain the main canopy and the deployment bag coupled to the ILAP. The canopy release pin(s) may be coupled to the container 25 if used and/or to the deployment bag 51 stabilization system if used. Operationally pulling the canopy release pin(s) allows the main canopy to begin its deployment sequence.

Steering lines 36 are coupled to the canopy 50, commonly at its tail end, and extend therefrom to a spooling mechanism 70 on the AGU 15. At least one steering line is routed from the spooling mechanism 70 through the baffles 37, to engage the trigger pin 35, and continues to the canopy. It is noted that the canopy 50, risers 55, suspension lines 65, and steering lines 36 are packed and held in an arrangement designed to provide reliable deployment and inflation of the main canopy. "Canopy" and "parachute" are used interchangeably herein. The canopy/parachute may be a wing-type parachute, round, etc. or any other suitable shape or type parachute sufficient to accomplish the mission requirements.

The release mechanism 32 is placed in the closed state, its trigger loop 34 is routed via hole 312, and is held in place by engagement with trigger pin 35. Trigger pin 35 is engaged by at least one steering line 36. While in the closed state, the release mechanism hook 39 engages one or more drogue holding lines 33. In the embodiment depicted in FIGS. 3-6 and FIG. 16 the drogue attachment comprises four drogue holding lines, each being coupled to a respective yoke 31. The drogue holding lines are routed through holes in the frame. In certain embodiments direct coupling between the yoke 31 and the release mechanism hook 39 is sufficient to the drogue attachment as shown by way of example in FIG. 16. In other versions, a drogue attachment where the drogue bridle is directly engaged by the hook 39 is also specifically considered (Not shown). It is noted that any number of drogue attachments and drogue attachment lines may be utilized. In the embodiments of FIGS. 3-6 the drogue attachment are arranged in pulley arrangement as described above.

In the drop ready state, the drogue 40 is disposed in a drogue bag 45 on top of the main canopy container 25 or the deployment bag 51, as applicable. The drogue bag 45 may be attached to a static line 42 coupled to the aircraft or may be coupled to the optional pilot parachute 47 and thereby coupled to the static line 42 and to the aircraft.

The drogue bridle is coupled to the individual yokes 31. A main activation line 52 is connected to the drogue either directly, by a line known as a kill line (not shown), or to the drogue bridle. The main activation line 52 is connected to at least one canopy release pin, which is coupled to the deployment bag 51 stabilization system and/or the container 25, such that operationally a pull of the canopy release pin(s) would release and deploy the main canopy 50. Upon dropping of the parachuting assembly from the aircraft, the static line 42 releases either the drogue, or first the pilot parachute 47 which then releases the drogue 40 from its bag 45, and the drogue inflates. When the drogue inflates the drogue fall stage begins. In drogue fall, the drogue 40 is held by its bridle 43, which is in turn coupled via the yokes 31 and drogue holding lines 33 to the hook 39 of release mechanism 32. The drag force imparted to the drogue 40 as the assembly drops is translated therefor to a tensile force operating, inter alia on the release mechanism hook 39.

In the exemplary embodiment, after a predetermined amount of time the AGU initiates the transition from drogue fall to full flight mode. Such initiation is made by spooling the steering lines 36 to impart tensile force thereto. The tensile force imparted to line 36 is translated by the baffles 37 to a bending force imparted to the flexible line which serves as trigger pin 35. When sufficient bending force is applied, the trigger pin bends and releases the release mechanism trigger loop 34. As the release mechanism hook 39 is under tension, the release mechanism 32 transitions to an open state, the hook opens, and the drogue holding lines are released. The yokes 31 and the holding lines 33 are pulled away from the ILAP, and the main activation line 52 is pulled by the collapsing drogue to pull the canopy release pin 53 and allow the main canopy deployment bag 51 to separate from the ILAP. This separation begins the deployment of the main canopy, and the parachuted assembly begins its transition into full flight mode.

Figure 12:
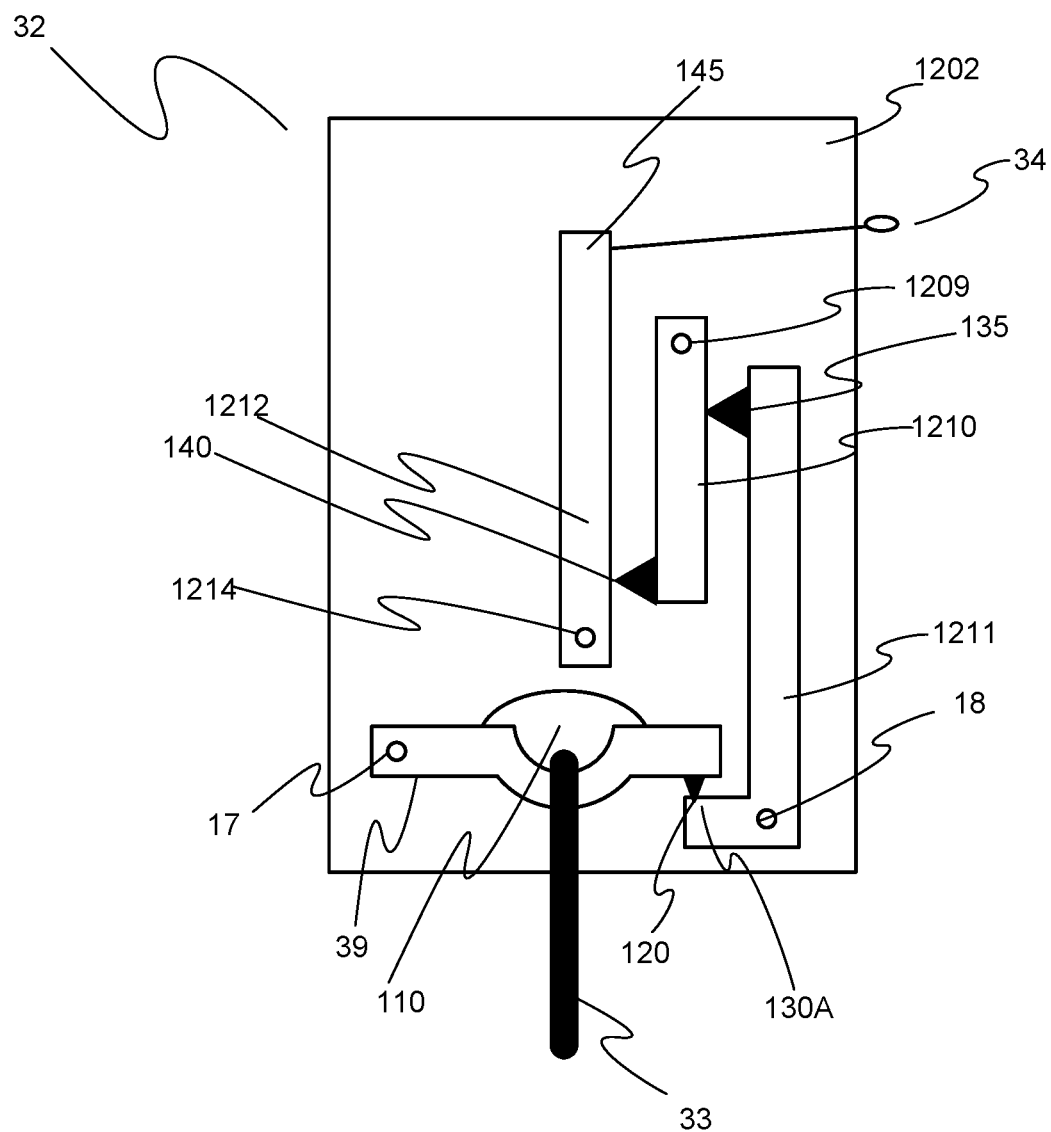
FIG. 12 depicts a schematic arrangement of an optional release mechanism.

FIG. 12 depicts a general schematic cross section of one embodiment of a release mechanism 32 suitable for use in embodiments of the invention. The release mechanism as depicted in U.S. patent application Ser. No. 16/886,726 comprising a support frame 1202 defining an operational plane, and a plurality of interlockable levers operational to controllably maintain the release mechanism in closed state, and to release at least one tensioned line from the release mechanism responsive to transitioning of the interlocking levers, and thus the release mechanism, from the closed state to an open state. The interlockable levers are interlocked when the release mechanism is in the closed state. While the depicted embodiment utilizes three levers and a hook which acts as additional lever, the skilled person would recognize that the number of levers may vary as required by the mission requirements.

A trigger lever 1212 comprising a retaining region and a trigger fulcrum 1214. The trigger lever is rotatable about the trigger fulcrum; a middle lever 1210 has a middle lever abutment 140, and is rotatable about a middle lever fulcrum 1209. The middle lever is disposed such that when the mechanism is operationally in the closed state the middle lever abutment 140 rests against the trigger lever 1212 at a trigger lever load region; a release lever 1211 has a release lever abutment 135 and is rotatable about a release lever fulcrum 18. The release lever further comprises a hook retainer 130A. The release lever is disposed such that when the release mechanism is operationally in the closed state the release lever abutment 135 rests against the middle lever 10 at a middle lever load region. A hook 39 is rotatable about hook fulcrum 17 and has a hook abutment 120, the hook is disposed such that when the release mechanism is operationally in closed state, the hook abutment directly or indirectly engages the hook retainer 130A. At least a portion of the hook cooperates with at least a portion of the frame 2, to define a closure 110 dimensioned to receive and retain the operationally tensioned one or more drogue holding line(s) 33. A trigger line terminating with a trigger loop 34 is coupled to the trigger lever 12 retaining region, the trigger line is operative to selectively maintain the trigger lever at a locked state where the trigger lever prevents the middle lever from rotating away from the release lever, therefore maintaining the release mechanism in the closed state, the release mechanism is configured such that operationally when the trigger is released, the trigger lever is allowed to rotate such that the middle lever is capable of rotating away from the release lever, allowing the release lever to rotate and release the hook abutment from the hook retainer 130A, and thus transition the release mechanism from the closed state to the open state. In some embodiments, as shown, the trigger comprises a line extending outside the ILAP, terminating in a trigger loop 34 that is selectively held by trigger pin 35. An additional release force Fa may optionally be applied to facilitate the mechanism opening upon trigger operation. As described the optional additional release force Fa may be applied by any desired device, such as a spring, a compressive element, and the like. The skilled in the art would readily recognize numerous possible locations where the additional release force Fa may be applied to various members of the release mechanism, and the specific location in the drawings is shown merely by way of example.

The trigger may be embodied as any pulling/tension device, spring, piston, intermediate line, electric motor, electric spools, electric solenoid, screw, or any other device/method suitable to exert sufficient tensile force against the trigger lever and controllably allow transition of the release mechanism 32 from the closed state to the open state. In certain embodiments of the release mechanism the trigger lever is held in place against a holding force and the trigger actively applies force thereto in order to dislodge the trigger lever 1212, allowing the release mechanism 32 to open.

Figure 13:
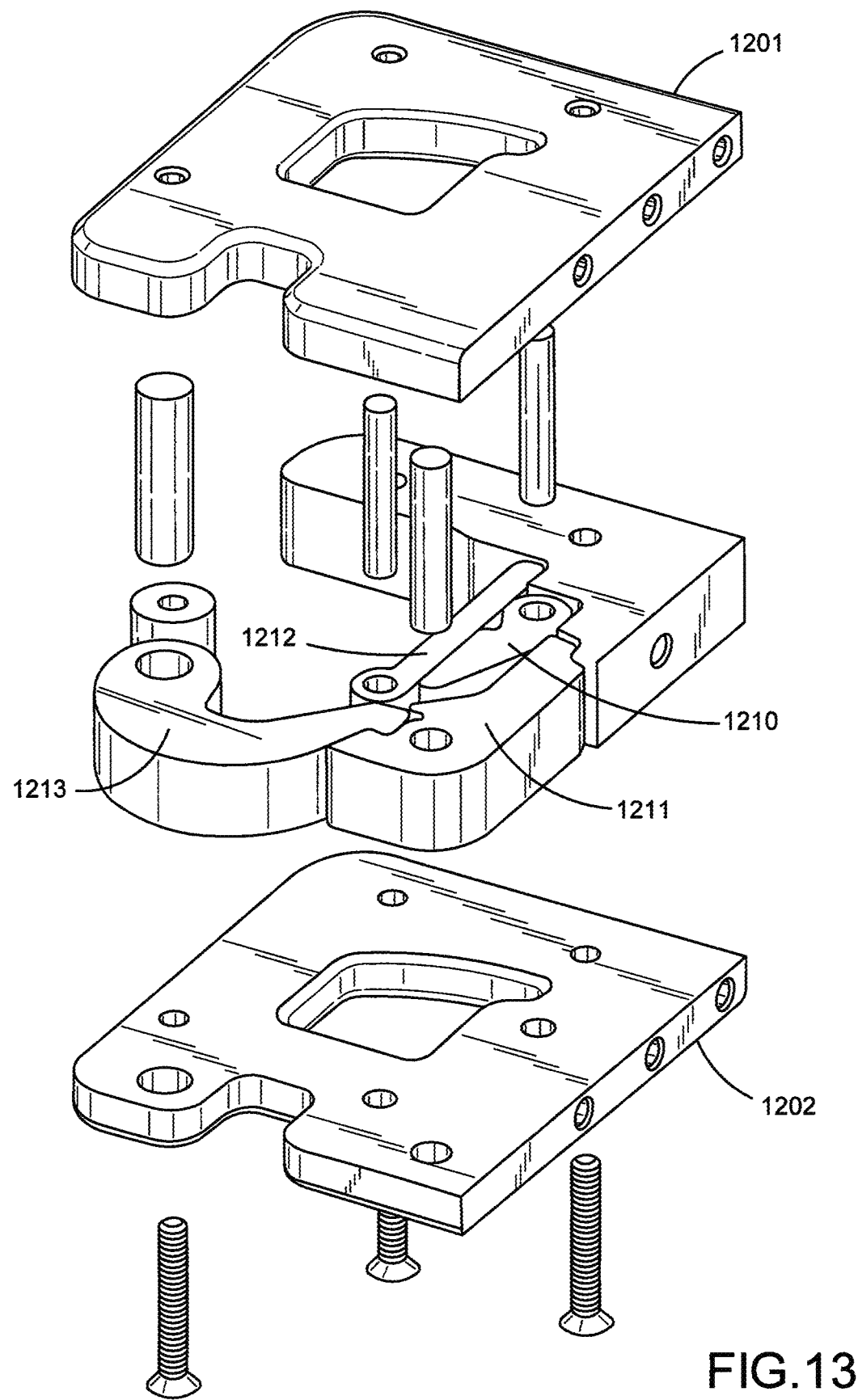
FIG. 13 depicts an exploded view of an optional compact embodiment of the release mechanism of FIG. 12.
Figure 14:
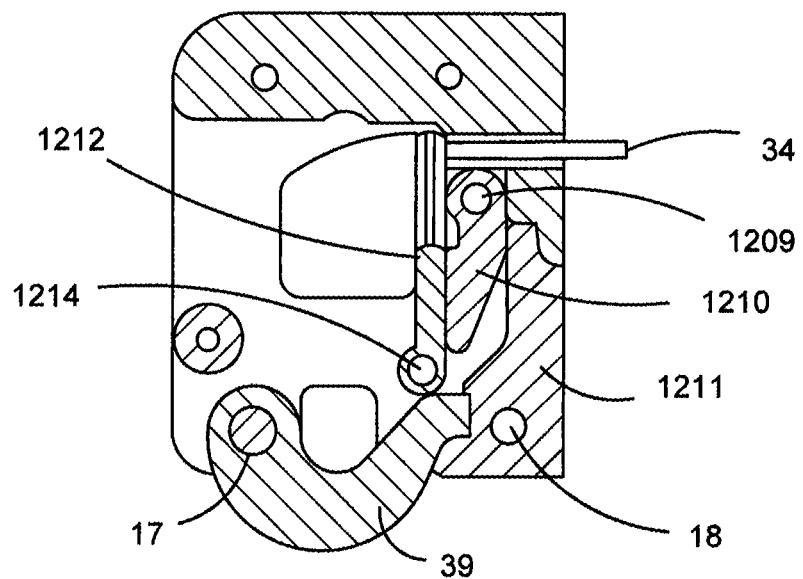
FIG. 14 depicts a cross section of the release mechanism of FIG. 13 shown in closed state.
Figure 15:
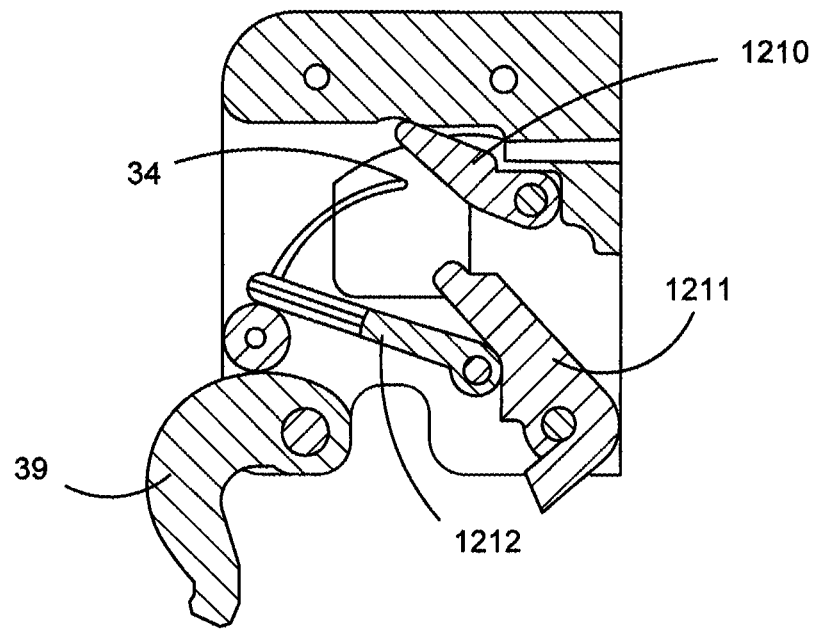
FIG. 15 depicts a cross section of the release mechanism of FIG. 13 shown in an open, released state.

FIG. 13 depicts an exploded view of an optional compact embodiment of a release mechanism operating similarly to the schematically depicted in FIG. 12, where the levers are disposed between two plates 1201 and 1202 respectively which together define the release mechanism operational plane. FIG. 14 depicts a cross section of the release mechanism of FIG. 13 while in closed state and FIG. 15 depicts a cross section of the release mechanism of FIG. 13 while in an open, fully released state.

Figure 16:
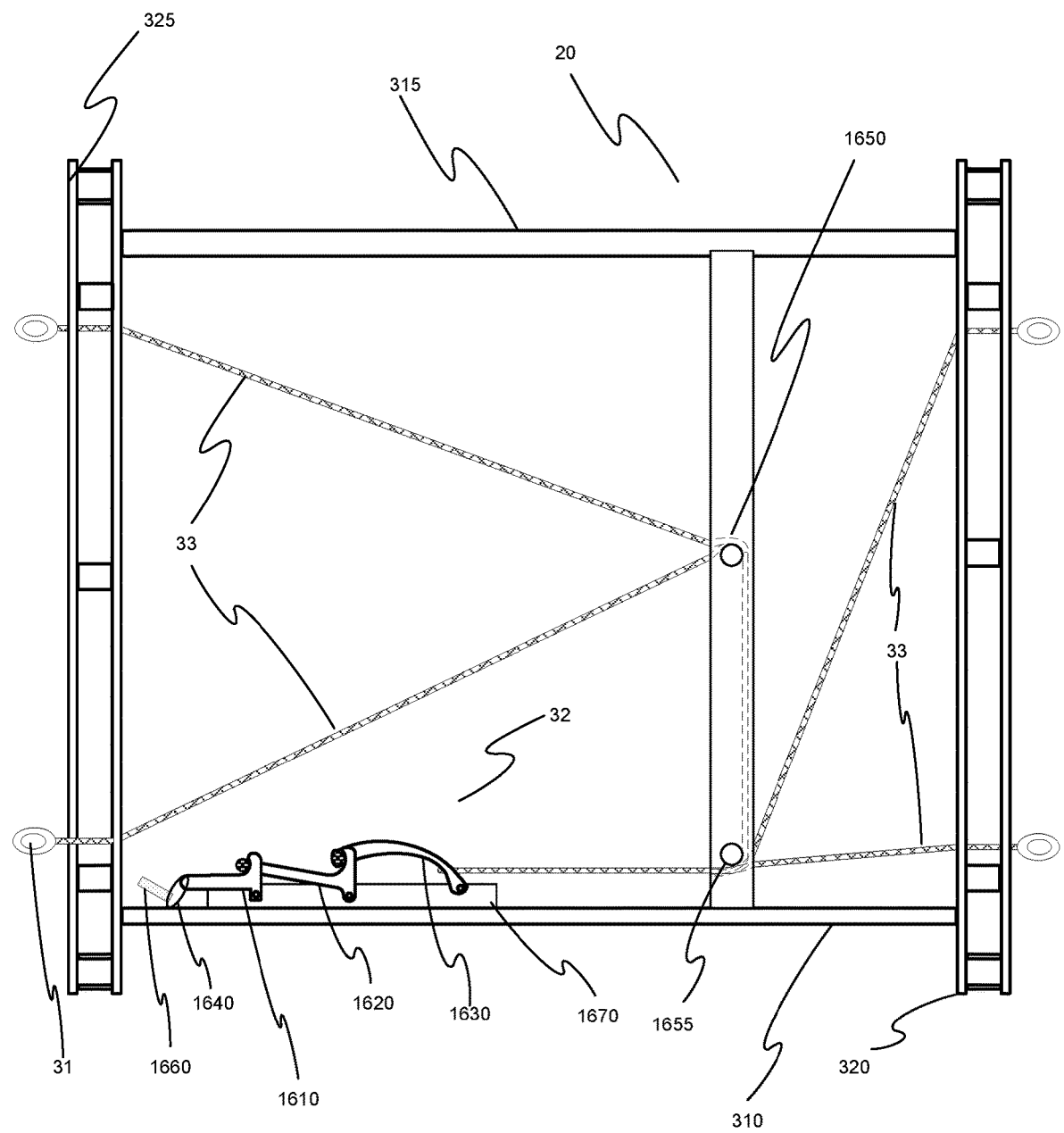
FIG. 16 depicts a simplified top view of an embodiment of an ILAP utilizing different release mechanism and setup.

FIG. 16 depicts an ILAP utilizing a different release mechanism, and serves primarily to show the broad nature of release mechanisms which may be utilized by various embodiments of the invention, while benefitting from the protection and stability obtained by the placement of the release mechanism, or at least a portion thereof, within the confines of the ILAP frame 28. The release mechanism comprises a first 1610, second 1620 and third 1630 interlockable levers, the third lever 1630 acting as a hook which holds the drogue holding lines 33. Holding lines are routed around pins 1650 and 1655 so as to dispose the ends of the lines in a direction facilitating their release when the hook 1630 opens. The levers 1610, 1620 and 1630 may be rotatably coupled to a base 1670 which is in turn coupled to the ILAP, or may be rotatably coupled to a wall of the ILAP. The first lever 1610 is held by a trigger loop 1640 which serves to hold the first lever from releasing the closing mechanism 32. A cutting device 1660 is attached to the trigger loop 1640 and when activated cuts the trigger loop, initiating the release of the trigger mechanism. The cutting device may be any device capable of cutting or otherwise releasing trigger loop 1640, such as by way of example an electrical cutter, pyrotechnic cutter, mechanical cutter, and the like including any combination thereof.

The embodiment depicted in FIG. 16 further exemplify yet another method of coupling the drogue, where the drogue holding lines 33 are coupled to the drogue bridle via the buckles 31 but without utilizing a pulley arrangement as shown for example in FIGS. 3-8.

The release mechanism 32 utilized in the embodiment of FIG. 16 was disclosed in US Patent Publication No. 2020/0123815 to Fox Jr., however combinations of other release mechanisms 32, utilizing other trigger arrangements, and drogue connection to the release mechanism arrangements will be clear to the skilled in the art in view of these specification. By way of non-limiting example, the release mechanism may be a single latch system, pyrotechnic cutting device, and the like. Drogue holding lines may vary in number and arrangement, and various optional intermediate members may also be utilized without departing from the invention.

Notably, the drogue release does not necessitate complete detachment of the drogue from the parachuted assembly, but rather the release of the drogue allows the drogue to collapse, followed by deployment of the main canopy, transitioning the assembly from drogue fall to flight mode. Alternatively, the bridle and drogue may be allowed to completely detach from the entire assembly after parachute inflation.

To make an ILAP, one would assemble the frame components. As shown by way of example in FIG. 3, the frame may be assembled by coupling of a plurality of walls to each other. Cargo anchors, canopy anchors are formed or added to meet system requirements, such as cargo weight, canopy size, and the like. Strengthening members, baffles, holes, slots, and the like are formed and connected to fit the mission requirements. The release mechanism is anchored and placed, at least partially, within the frame. The ILAP components may be assembled in any logical order. Components may be made from any suitable materials, such as made by plastic injection, printed by a 3D printer cut from bulk raw material, and/or otherwise machined. The components may be assembled using any suitable method, such as welding, fasteners, interlocking portion and the like. Suitable materials include metal, plastic, wood, etc. or any other suitable materials sufficient to accomplish their respective task. Additional components for assisting in operation such as springs, equipment mounts, additional compartments, interconnecting members, and the like may be utilized. The materials, methods of manufacturing and/or assembling, and optional components are provided merely by way of example and should not be construed as limiting.

As disclosed, the release mechanism is attached or at least partially built into the ILAP. Portions of the ILAP may form portions of the release mechanism, such as, by way of example, a portion of the ILAP wall may act as an anchor for the release mechanism and/or a limiting plate of the release mechanism, and the like.

In some embodiments there is further provided an actuator coupled to release mechanism, and operational to allow the release mechanism to transition from the closed to an open state. The actuator may be selected from an altitude sensing actuator, a timer controlled actuator, a speed sensor controlled actuator, an acceleration sensor controlled actuator, a location sensor controlled actuator, a radio controlled actuator, an automatic and/or manual remote controlled actuator, a light controlled actuator, a guidance system controlled actuator, temperature sensing actuator, pressure sensing actuator and any combination thereof.

In these specifications the term 'operational' and its variations (such as "operationally" by way of example) should be construed when applied to the release mechanism or to portions thereof, to describe the release mechanism while a tension is applied between its anchor point and the hook, or immediately after release of such tension subsequent to a transition of the release mechanism from close state where it is under tension to an open state where the tension is released, as well as to release mechanism is being in the transition period. When the term 'operational' and its variations is applied to a parachute system it should be construed to describe the parachute system while being dropped from an aircraft, in all of the respective stages of the transition from the aircraft to the ground.

The term release force as used herein relates to force required to directly or indirectly be applied to a portion of the trigger, such as by way of example, a release activation line through the release activation loop to affect a release the trigger lever and subsequently release a taut line held by the rotatable hook as explained above, or to forces required to be applied directly or indirectly to another portion of the release mechanism to maintain the tensile tension between the running and standing lines.

The term lines encompass actual lines—ropes, cables, wires, cords, webbing, and the like, group or groups of lines, such as a plurality of separate lines, as well as rods, shackles, eyelets, hooks, links, and the like. Any combination of lines and extensions thereof such as shackles, eyelets, and the like should be construed as the line itself. The term line also extends to a portion of an object which constitutes one part of a load which is applied to the release mechanism in the closed state, and released thereby when the release mechanism is in the open state.

Notably, whenever the term 'and/or' is used in these specifications and the attached claims, it should be construed as any number, combination or permutation of all, one, some, a plurality or none of each of the item or list mentioned. It is also understood that (s) designates either singular or plural. It is further understood that that "or" is an inclusive "or" to include all items in a list and not intended to be limiting and means any number, combination or permutation of all, one or plurality of each of the item or list mentioned, unless the term 'or' is explicitly defined as exclusive, or if the context would clearly indicate an exclusive or to the skilled artisan. It is also understood that "include(s)" and/or "including" means "including but not limited to" any number, combination or permutation of all, one or plurality of each of the item or list mentioned.

Although the foregoing invention has been described in detail by way of illustration and example, it will be understood that the present invention is not limited to the particular description and specific embodiments described but may comprise any combination of the above disclosed elements and their equivalents and variations thereof, many of which will be obvious to those skilled in the art in view of the present disclosure, and the invention extends to such variation.

We claim:

1. A cargo parachute system intermediate load attachment platform comprising:
a frame having at least one cargo anchor, at least one main parachute anchor, and a drogue attachment;
a release mechanism at least partially disposed within, and/or embedded in, the platform, the release mechanism having a trigger and a releasable hook dimensioned to selectively engage at least a portion of the drogue attachment, and being transitionable between a closed state and an open state responsive to trigger activation;
whereby while in the closed state at least a portion of the drogue attachment is engaged by the release hook, and while in the open state the drogue attachment is disengaged from the hook, thereby releasing the drogue from the platform.

2. An intermediate load attachment platform as claimed in claim 1, wherein the frame comprises a plurality of vertically extending external walls each wall extending between a frame upper portion and a frame lower portion, the external walls defining an intraframe space, and wherein the release mechanism is disposed at least partially within the intraframe space.

3. An intermediate load attachment platform as claimed in claim 1, wherein the drogue attachment comprises a plurality of drogue holding lines.

4. An intermediate load attachment platform as claimed in claim 3, wherein at least one of the drogue holding line is coupled to a yoke and is routed to the yoke via a drogue anchor.

5. An intermediate load attachment platform as claimed in claim 4, wherein the drogue holding line is coupled to the yoke and the drogue anchor in a compound pulley arrangement.

6. An intermediate load attachment platform as claimed in claim 1, further comprising at least one drogue anchor integrated with the cargo anchor, the main parachute anchor, or with a combination thereof.

7. An intermediate load attachment platform as claimed in claim 1, wherein the release mechanism comprises a plurality of interlockable levers capable of forming a mechanical sequence therebetween, wherein a first lever in the mechanical sequence operating as a trigger lever for starting a release sequence of the release mechanism, a last lever in the mechanical sequence rotatably and controllably operating as the release hook for ending the release sequence, and wherein the levers interlock in a first pre-determined configuration in the closed state and unlock into a second pre-determined configuration in the open state.

8. An intermediate load attachment platform as claimed in claim 1, wherein the at least one main parachute anchor point is coupled to or embedded in top portion of the frame, and the at least one cargo anchor point is coupled to or embedded in the a bottom portion of the frame.

9. A cargo parachute system for parachuting a cargo load, the system comprising:
an intermediate load attachment platform comprising a frame having a cargo anchor point, a main parachute anchor point, and a drogue attachment;
a main parachute coupled to the main parachute anchor point;
a drogue parachute having a drogue bridle coupled to the drogue attachment;
a release mechanism at least partially disposed within, and/or embedded in, the platform, the release mechanism having a trigger and a releasable hook dimensioned to engage a portion of the drogue attachment, and being transitionable between a closed state and an open state responsive to trigger activation;
the cargo parachute system further comprising an actuator configured to activate the trigger so as to allow the release mechanism to transition from the closed state to the open state, whereby, operationally, the drogue attachment or a portion thereof is released from the platform upon transition of the release mechanism from the closed state to the open state.

10. A cargo parachute system as claimed in claim 9, further comprising a main activation line having a first end coupled directly or indirectly to the drogue, and a second end coupled to a main canopy release.

11. A cargo parachute system as claimed in claim 10, wherein the canopy release comprises at least one pin, operational to initiate a main parachute deployment sequence responsive to a tensile force exerted by the drogue after release of the drogue attachment.

12. A cargo parachute system as claimed in claim 9, further comprising an automated guidance unit, for operationally guiding the descent of the parachute system.

13. A cargo parachute system as claimed in claim 12, wherein the actuator is integrated with the automated guidance unit or a portion thereof.

14. A cargo parachute system as claimed in claim 12, wherein the automated guidance unit is at least partially disposed inside the platform.

15. A cargo parachute system as claimed in claim 9, wherein the frame is integrated with an automated guidance unit.

16. A cargo parachute system as claimed in claim 9, wherein prior to main parachute deployment, the main parachute is disposed in a deployment bag which is coupled to the platform by a parachute restraining system.

17. A cargo parachute system as claimed in claim 9, wherein the actuator is actuated responsive to a condition selected from time elapsed from dropping the parachute system from an aircraft, altitude, speed, acceleration, pressure, location, and any combination thereof.

18. A cargo parachute system as claimed in claim 9, wherein the trigger is selected from an electrical solenoid, a motor, an electric al or mechanical timer, an impeller driven release, a pressure activated release, and any combination thereof.

19. A cargo parachute system as claimed in claim 9, further comprising an automated guidance unit having at least one spool, and a line coupled between the spool and the trigger, the trigger being operable by a pull of the line.

20. A cargo parachute system as claimed in claim 19, wherein the line is a parachute steering line, further coupled between the trigger and a trailing edge of the main parachute, and the line is operable to release the trigger and thereafter to at least partially steer the parachute during descent.

* * * * *